United States Patent
Huang et al.

(10) Patent No.: US 10,120,108 B2
(45) Date of Patent: Nov. 6, 2018

(54) PANEL ASSEMBLY AND ELECTRONIC DEVICE

(71) Applicant: HTC Corporation, Taoyuan (TW)

(72) Inventors: Po-Chin Huang, Taoyuan (TW);
Shih-Po Chien, Taoyuan (TW);
Yu-Jing Liao, Taoyuan (TW); I-Cheng Chuang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 99 days.

(21) Appl. No.: 14/621,408

(22) Filed: Feb. 13, 2015

(65) Prior Publication Data

US 2016/0238747 A1   Aug. 18, 2016

(51) Int. Cl.
| | | |
|---|---|---|
| G02B 3/08 | (2006.01) | |
| G02B 5/00 | (2006.01) | |
| G02B 27/02 | (2006.01) | |
| G06F 3/00 | (2006.01) | |
| H04M 1/02 | (2006.01) | |

(52) U.S. Cl.
CPC ............ G02B 3/08 (2013.01); G02B 27/027 (2013.01); G06F 3/00 (2013.01); H04M 1/0266 (2013.01); H04M 1/0283 (2013.01)

(58) Field of Classification Search
CPC ........ G06F 1/16; G06F 1/1601; G06F 1/1626; G06F 1/1643; G06F 1/1658; G02B 27/01; G02B 27/14; G02B 27/22; G02B 27/2214; G02B 3/08
See application file for complete search history.

(56) References Cited

U.S. PATENT DOCUMENTS

| | | | |
|---|---|---|---|
| 6,185,045 B1* | 2/2001 | Hanano | G02B 27/0172 359/630 |
| 8,368,729 B2 | 2/2013 | Watanabe | |
| 8,848,139 B2 | 9/2014 | Niioka et al. | |
| 2005/0046939 A1* | 3/2005 | Yoshikawa | G03B 21/60 359/457 |
| 2010/0232025 A1* | 9/2010 | Kwon | G02F 1/133512 359/625 |
| 2011/0157061 A1* | 6/2011 | Kao | G06F 3/045 345/173 |

(Continued)

FOREIGN PATENT DOCUMENTS

| | | |
|---|---|---|
| CN | 101280905 | 10/2008 |
| CN | 101663616 | 3/2010 |
| TW | 201122955 | 7/2011 |

OTHER PUBLICATIONS

"Office Action of Taiwan Counterpart Application", dated Mar. 22, 2016, p. 1-p. 6, in which the listed reference was cited.

(Continued)

*Primary Examiner* — William R Alexander
*Assistant Examiner* — Ephrem Mebrahtu
(74) *Attorney, Agent, or Firm* — JCIPRNET

(57) ABSTRACT

A panel assembly includes a transparent cover, a display module, a decorative layer, and a Fresnel lens structure. The transparent cover has a lower surface. The display module is disposed under the lower surface. The decorative layer is disposed on the lower surface. The Fresnel lens structure is located above the display module. Besides, an electronic device includes a frame, a housing, and the above panel assembly, and the housing and the panel assembly are installed in the frame.

10 Claims, 5 Drawing Sheets

(56) References Cited

U.S. PATENT DOCUMENTS

| | | | | |
|---|---|---|---|---|
| 2013/0141800 A1* | 6/2013 | Oi | ............................ | G02B 3/08 |
| | | | | 359/708 |
| 2013/0343038 A1* | 12/2013 | Niu | ......................... | G09F 13/04 |
| | | | | 362/97.1 |
| 2014/0085738 A1* | 3/2014 | Qian | ......................... | B60R 1/08 |
| | | | | 359/726 |
| 2015/0043137 A1* | 2/2015 | Lee | ....................... | G06F 1/1656 |
| | | | | 361/679.3 |
| 2016/0139460 A1* | 5/2016 | Takase | ..................... | G02B 3/08 |
| | | | | 349/57 |

OTHER PUBLICATIONS

"Office Action of Cnina Counterpart Application", dated May 23, 2018, p. 1-p. 8.

\* cited by examiner

PANEL ASSEMBLY AND ELECTRONIC DEVICE

BACKGROUND OF THE INVENTION

Field of the Invention

The application relates to a panel assembly and particularly relates to a panel assembly having a touch function and an electronic device utilizing the panel assembly.

Description of Related Art

Electronic devices, such as smart phones and tablet computers, are very popular among the consumers for their versatile functions and thin and light designs. This type of electronic device is usually equipped with a panel assembly having a touch function. The panel assembly includes a transparent cover, a touch module, and a display module. Colored ink (black ink, for example) is applied around the lower surface of the transparent cover to form a decorative layer for covering a peripheral circuit of the touch module or other components that need to be hidden. In order to cover and shield the peripheral circuit of the touch module, borders formed by the decorative layer on two opposite sides of the lower surface of the transparent cover are necessary.

SUMMARY OF THE INVENTION

The application provides a panel assembly for visually narrowing or hiding a border formed by a decorative layer disposed on a transparent cover.

The panel assembly of the application includes a transparent cover, a display module, a decorative layer, and a Fresnel lens structure. The transparent cover has a lower surface. The display module is disposed under the lower surface. The decorative layer is disposed on the lower surface. The Fresnel lens structure is located above the display module.

The application provides an electronic device that includes a frame, a housing, and the panel assembly, wherein the housing and the panel assembly are installed in the frame.

Based on the above, according to the invention, the Fresnel lens structure changes the direction of an image light from the display module to visually enlarge the image generated by the display module or reduce a viewing angle range of the image displayed by the display module.

To make the aforementioned and other features and advantages of the application more comprehensible, several embodiments accompanied with drawings are described in detail as follows.

DESCRIPTION OF THE EMBODIMENTS

Figure 1A:
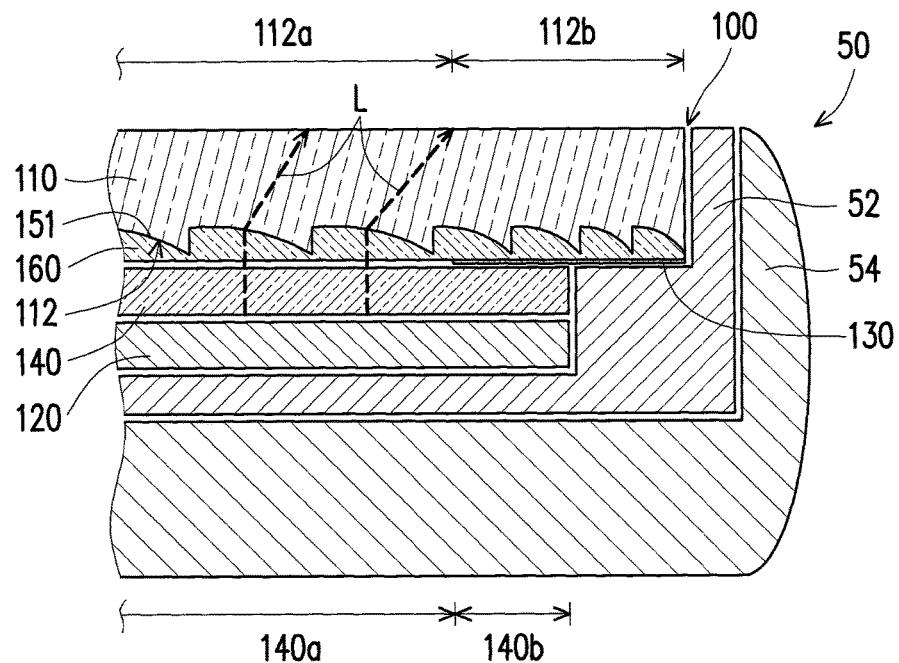
FIG. 1A is a partial cross-sectional view of an electronic device having a panel assembly according to an embodiment of the invention.

With reference to FIG. 1, in this embodiment, an electronic device 50 includes a frame 52, a housing 54, and a panel assembly 100. The housing 54 and the panel assembly 100 are both assembled to the frame 52. The panel assembly 100 includes a transparent cover 110, a display module 120, and a decorative layer 130. The transparent cover 110 has a lower surface 112. The display module 120 is disposed under the lower surface 112. The decorative layer 130 is disposed on the lower surface 112. The lower surface 112 of the transparent cover 110 has a central region 112a and a peripheral region 112b surrounding the central region 112a. The decorative layer 130 is disposed on the peripheral region 112b of the lower surface 112 to cover and shield a peripheral circuit of a touch module 140.

In this embodiment, the panel assembly 100 configured for touch input further includes the touch module 140. The touch module 140 is disposed between the transparent cover 110 and the display module 120. The touch module 140 includes a transparent circuit region 140a and a non-transparent circuit region 140b. The peripheral region 112b substantially corresponds to the non-transparent circuit region 140b of the touch module 140, and the decorative layer 130 covers the non-transparent circuit region 140b. The touch module 140 may be an additional touch module. That is, the touch module 140 and the display module 120 are separately fabricated and then assembled together. Alternatively, the touch module 140 may be a built-in touch module (including on-cell type or in-cell type). That is, the touch module 140 is fabricated simultaneously in the fabricating process of the display module 120, so as to form the touch module 140 and the display module 120 integrally.

The panel assembly 100 further includes a Fresnel lens structure 151 disposed at a junction of the central region 112a and the peripheral region 112b for changing the direction of an image light L from the display module 120. In particular, the periphery of the Fresnel lens structure 151 generates favorable effects in turning the image light L. The aforementioned Fresnel lens is an improved lens that is formed by forming a series of theoretically countless concentric lines on a traditional spherical lens, so as to achieve the same optical effects while thinning the lens thickness and saving the material.

Figure 2A:
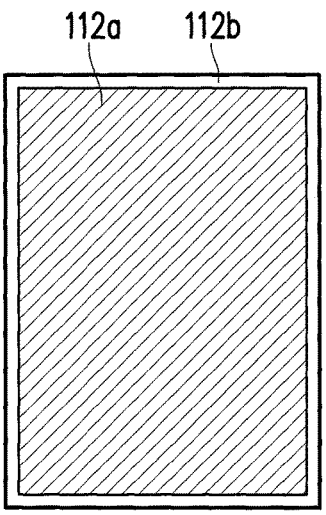
FIG. 2A and FIG. 2B are schematic views respectively showing images of a display module before and after being enlarged by a Fresnel lens structure of FIG. 1A.
Figure 2B:
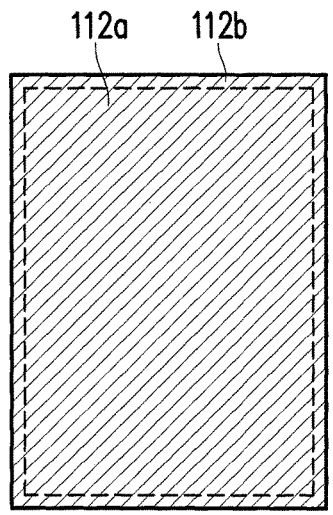

In this embodiment, the Fresnel lens structure 151 is a diverging lens. The Fresnel lens structure 151 visually enlarges the image generated by the display module 120, as indicated by the shaded portions in FIG. 2A and FIG. 2B. Therefore, the decorative layer 130 disposed on the peripheral region 112b is visually narrowed or hidden.

In this embodiment, the Fresnel lens structure 151 is disposed corresponding to the whole central region 112a. In another embodiment, as shown in FIG. 1B, the Fresnel lens structure 151 can be disposed only at the junction of the central region 112a and the peripheral region 112b, not in other portions of the central region 112a.

In this embodiment, the Fresnel lens structure 151 may be formed on the lower surface 112 of the transparent cover 110. In other words, in the process of fabricating the transparent cover 110, the lower surface 112 of the transparent cover 110 is directly formed into a convex-concave structure to serve as the Fresnel lens structure 151. Moreover, the panel assembly 100 may further include a transparent adhesive layer 160 covering the Fresnel lens structure 151 to make the Fresnel lens structure 151 even, and the decorative layer 130 is disposed on the transparent adhesive layer 160.

Figure 1B:
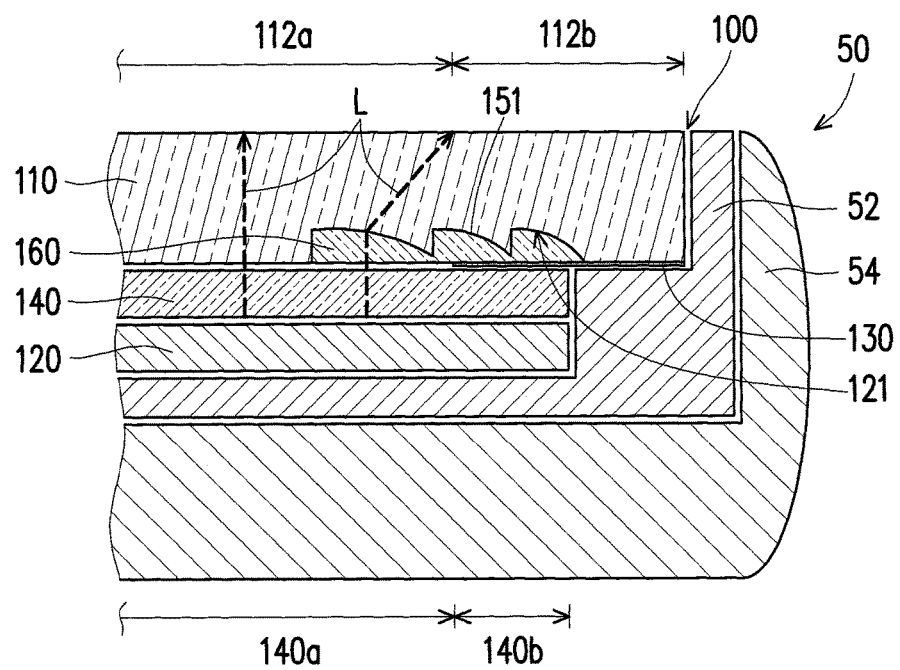
FIG. 1B is a partial cross-sectional view of an electronic device having a panel assembly according to another embodiment of the invention.
Figures 2C, 2D:
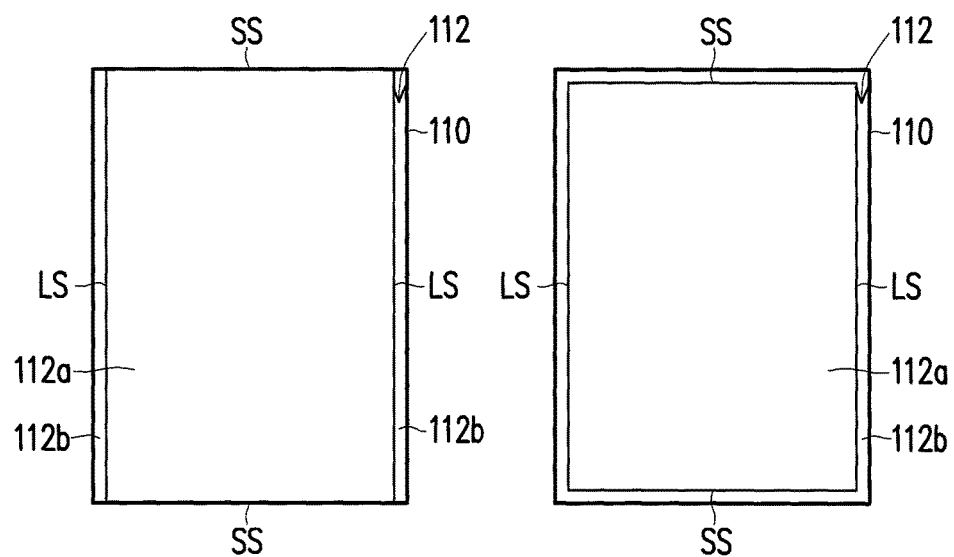
FIG. 2C and FIG. 2D are schematic views respectively showing a lower surface of a transparent cover according to two other embodiments of the invention.

In an embodiment, as shown in FIG. 1B and FIG. 2C, the central region 112a is rectangular and has a pair of long sides LS and a pair of short sides SS. The Fresnel lens structure 151 is disposed only along the pair of long sides LS. In another embodiment, as shown in FIG. 1B and FIG. 2D, the Fresnel lens structure 151 is disposed along the pair of long sides LS and the pair of short sides SS, and a curvature of a portion of the Fresnel lens structure 151 disposed on the pair of long sides LS is larger than a curvature of a portion of the Fresnel lens structure 151 disposed on the pair of short sides SS, such that the long sides LS generate a relatively strong refraction effect while the short sides SS generate a relatively weak refraction effect, thereby achieving a visual effect similar to the current 2.5D curved screen.

Figure 3A:
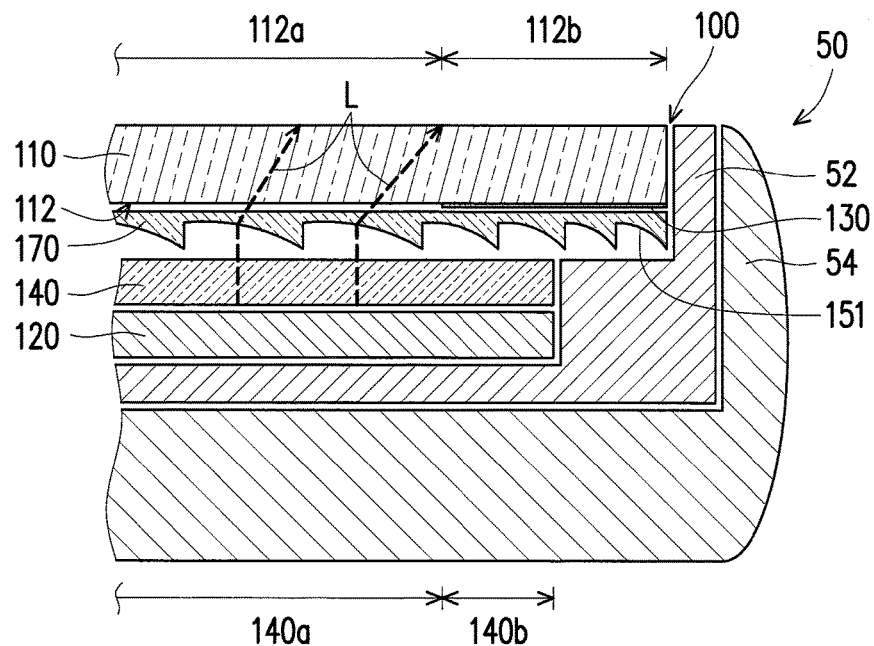
FIG. 3A is a partial cross-sectional view of an electronic device having a panel assembly according to another embodiment of the invention.
Figure 3B:
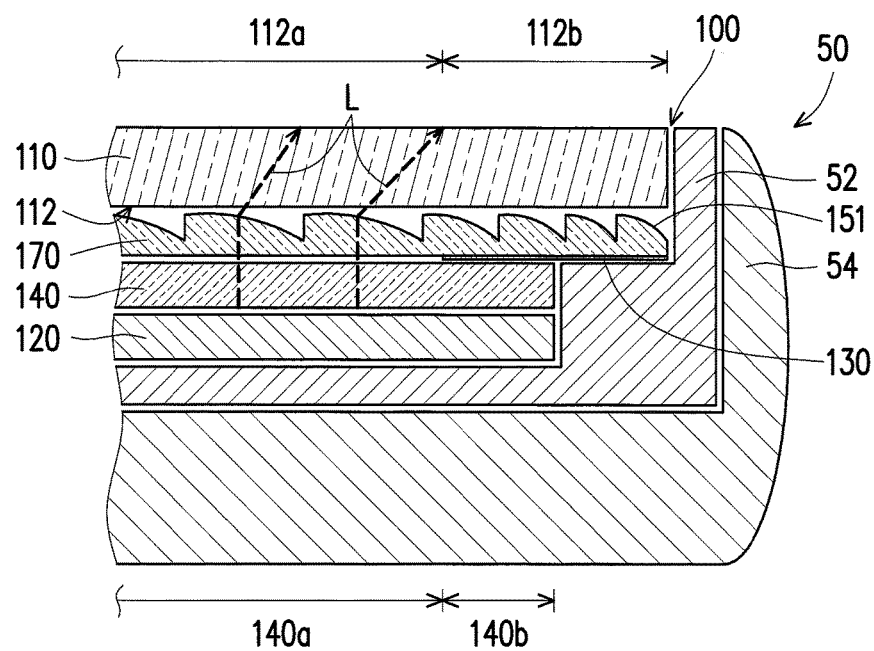
FIG. 3B is a partial cross-sectional view of an electronic device having a panel assembly according to another embodiment of the invention.
Figure 3C:
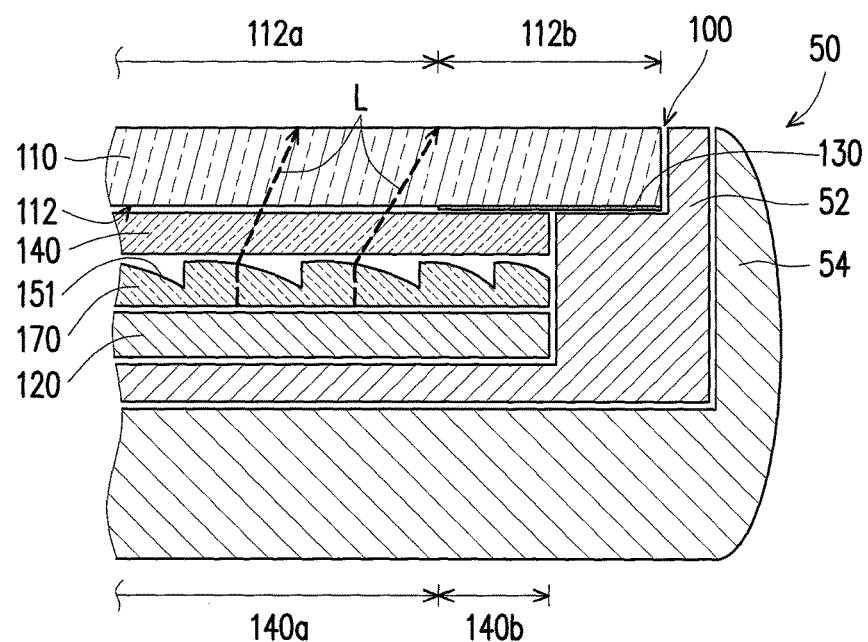
FIG. 3C is a partial cross-sectional view of an electronic device having a panel assembly according to another embodiment of the invention.

With reference to FIG. 3A, unlike the embodiment of FIG. 1 where the Fresnel lens structure 151 is formed on the lower surface 112 of the transparent cover 110, the panel assembly 100 of FIG. 3A further includes a thin film 170, and the Fresnel lens structure 151 is formed on a lower surface of the thin film 160. The thin film 170 is fabricated independently and then disposed between the transparent cover 110 and the display module 120 and located under the lower surface 112 of the transparent cover 110 and the decorative layer 130. In another embodiment, as shown in FIG. 3B, the Fresnel lens structure 151 is formed on an upper surface of the thin film 160 while the decorative layer 130 is disposed on the lower surface of the thin film 170. In another embodiment, as shown in FIG. 3C, the thin film 160 with the Fresnel lens structure 151 thereon is disposed between the touch module 140 and the display module 120.

Figure 4:
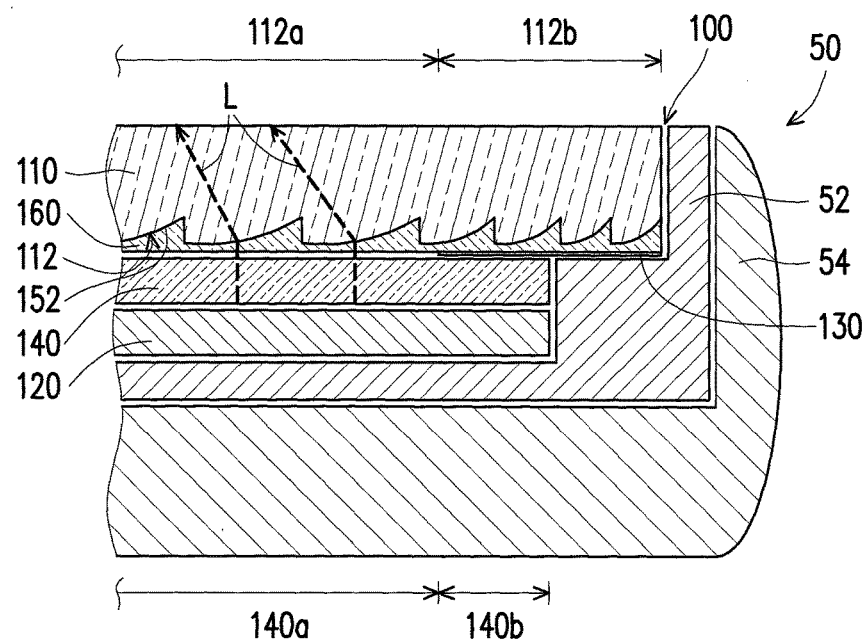
FIG. 4 is a partial cross-sectional view of an electronic device having a panel assembly according to another embodiment of the invention.

With reference to FIG. 4, unlike the embodiment of FIG. 1 where the Fresnel lens structure 151 is a diverging lens, a Fresnel lens structure 152 of FIG. 4 is a converging lens. Thus, visually a viewing angle range of the image displayed by the display module 120 is reduced to achieve an anti-peep effect.

Figure 5A:
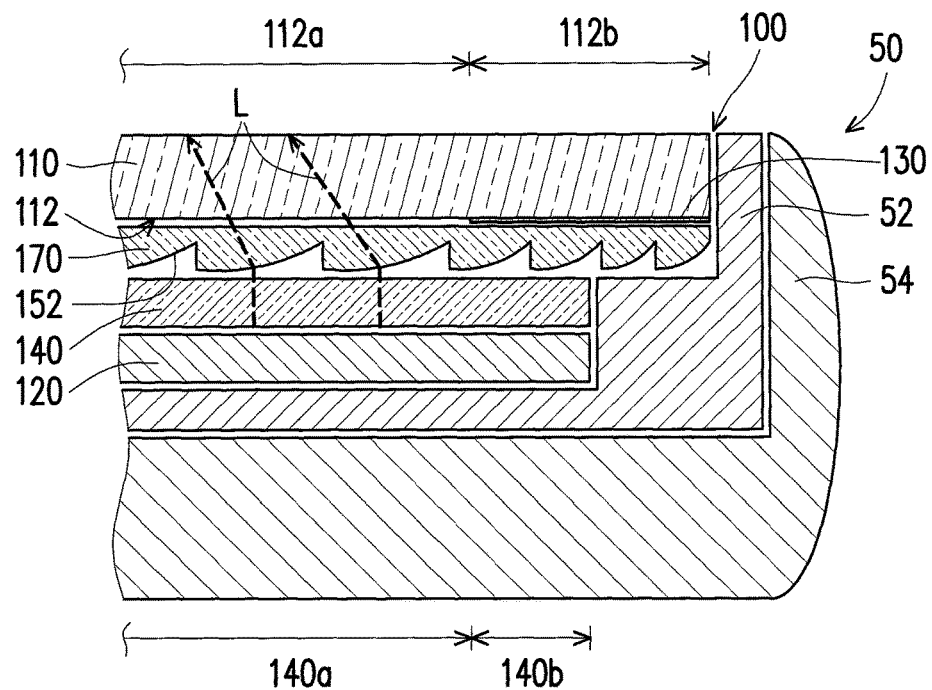
FIG. 5A is a partial cross-sectional view of an electronic device having a panel assembly according to another embodiment of the invention.
Figure 5B:
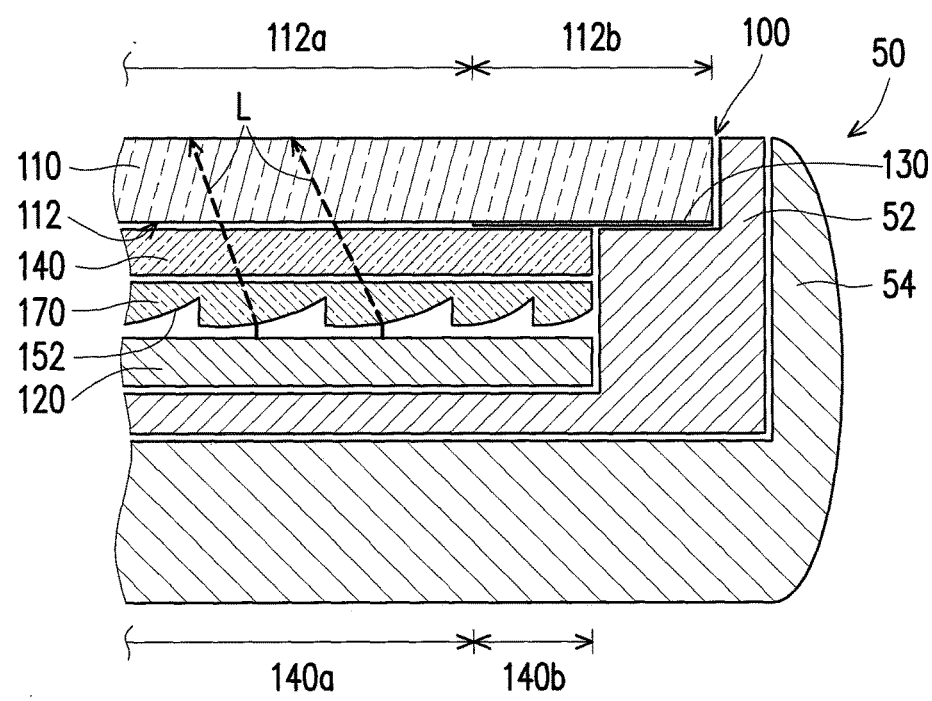
FIG. 5B is a partial cross-sectional view of an electronic device having a panel assembly according to another embodiment of the invention.

With reference to FIG. 5A, unlike the embodiment of FIG. 4 where the Fresnel lens structure 152 is directly formed on the lower surface 112 of the transparent cover 110, the Fresnel lens structure 152 of FIG. 5A is a thin film that is fabricated independently and then disposed under the lower surface 112 of the transparent cover 110 and the decorative layer 130. In addition, with reference to FIG. 5B, unlike the embodiment of FIG. 5A where the Fresnel lens structure 152 is disposed between the transparent cover 110 and the touch module 140, the Fresnel lens structure 152 of FIG. 5A is disposed between the touch module 140 and the display module 140.

In conclusion, according to the invention, the Fresnel lens structure is used to change the direction of the image light from the display module. If the Fresnel lens structure is a diverging lens, the image generated by the display module is enlarged visually to visually narrow or hide the decorative layer disposed on the peripheral region. If the Fresnel lens structure is a converging lens, the viewing angle range of the image displayed by the display module is reduced to achieve the anti-peep effect.

Although the application has been described with reference to the above embodiments, it will be apparent to one of the ordinary skill in the art that modifications and variations to the described embodiments may be made without departing from the spirit and scope of the application. Accordingly, the scope of the application will be defined by the attached claims not by the above detailed descriptions.

What is claimed is:

1. A panel assembly, comprising:
   a transparent cover comprising a lower surface;
   a display module disposed under the lower surface;
   a decorative layer disposed on the lower surface; and
   a Fresnel lens structure located above the display module, wherein the Fresnel lens structure is formed of a portion of the transparent cover at the lower surface of the transparent cover, and
   wherein the lower surface comprises a central region and a peripheral region outside the central region, and the Fresnel lens structure is only disposed corresponding to a junction of the central region and the peripheral region, the central region is rectangular and comprises a pair of long sides and a pair of short sides, the Fresnel lens structure is disposed along the pair of long sides and the pair of short sides, and a curvature of a portion of the Fresnel lens structure disposed on the pair of long sides is larger than a curvature of a portion of the Fresnel lens structure disposed on the pair of short sides.

2. The panel assembly according to claim 1, wherein the decorative layer is disposed on the peripheral region of the lower surface.

3. The panel assembly according to claim 1, further comprising:
   a touch module disposed between the transparent cover and the display module, wherein the touch module comprises a transparent circuit region and a non-transparent circuit region.

4. The panel assembly according to claim 1, further comprising:
   a transparent adhesive layer covering the Fresnel lens structure, wherein the decorative layer is disposed on the lower surface.

5. The panel assembly according to claim 1, wherein the Fresnel lens structure is a diverging lens or a converging lens.

6. An electronic device, comprising:
   a frame;
   a housing installed in the frame; and
   a panel assembly installed in the frame and comprising:
      a transparent cover comprising a lower surface;
      a display module disposed under the lower surface;
      a decorative layer disposed on the lower surface; and
      a Fresnel lens structure located above the display module, wherein the Fresnel lens structure is formed of a portion of the transparent cover at the lower surface of the transparent cover, and wherein the lower surface comprises a central region and a peripheral region outside the central region, and the Fresnel lens structure is only disposed corresponding to a junction of the central region and the peripheral region, the central region is rectangular and comprises a pair of long sides and a pair of short sides, the Fresnel lens structure is disposed along the pair of long sides and the pair of short sides, and a curvature of a portion of the Fresnel lens structure disposed on the pair of long sides is larger than a curvature of a portion of the Fresnel lens structure disposed on the pair of short sides.

7. The electronic device according to claim 6, wherein the decorative layer is disposed on the peripheral region of the lower surface.

8. The electronic device according to claim 6, wherein the panel assembly further comprises:
a touch module disposed between the transparent cover and the display module, wherein the touch module comprises a transparent circuit region and a non-transparent circuit region.

9. The electronic device according to claim 6, wherein the panel assembly further comprises:
a transparent adhesive layer covering the Fresnel lens structure, wherein the decorative layer is disposed on the lower surface.

10. The electronic device according to claim 6, wherein the Fresnel lens structure is a diverging lens or a converging lens.

* * * * *